US012780352B2

(12) United States Patent
Chen et al.

(10) Patent No.: US 12,780,352 B2
(45) Date of Patent: Nov. 3, 2026

(54) HUB MOTOR

(71) Applicant: TIEN HSIN INDUSTRIES CO., LTD., Taichung City (TW)

(72) Inventors: Chun-Wei Chen, Taichung City (TW); Chang-Chun Kao, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 451 days.

(21) Appl. No.: 18/371,457

(22) Filed: Sep. 22, 2023

(65) Prior Publication Data

US 2024/0383566 A1 Nov. 21, 2024

(30) Foreign Application Priority Data

May 19, 2023 (TW) ................................ 112118697

(51) Int. Cl.

| | |
|---|---|
| ***B62M 6/65*** | (2010.01) |
| ***B62J 11/19*** | (2020.01) |
| ***H02K 5/22*** | (2006.01) |

(52) U.S. Cl.

CPC ................ *B62M 6/65* (2013.01); *B62J 11/19* (2020.02); *H02K 5/225* (2013.01); *B60L 2220/44* (2013.01)

(58) Field of Classification Search

CPC ...... B62M 6/65; H02K 5/225; B60L 2220/44; B62J 11/19

See application file for complete search history.

(56) References Cited

U.S. PATENT DOCUMENTS 3,502,917 A * 3/1970 Bizoe ..................... H02K 5/225 310/71
7,781,678 B2 * 8/2010 Reed ........................ B62K 5/01 174/152 G
8,033,408 B2 * 10/2011 Makela .................. H02G 3/088 174/152 G
8,100,208 B2 * 1/2012 Jordan .................... B60L 50/66 180/65.6
8,497,435 B2 * 7/2013 Nagata ................. H02G 15/013 174/152 G
8,609,990 B2 * 12/2013 Levi ....................... H02G 3/088 174/152 G
8,657,047 B2 * 2/2014 Urabe ....................... B60L 7/14 301/6.5
9,247,335 B2 * 1/2016 Taylor ...................... H02G 3/22
9,450,327 B1 * 9/2016 Madinabeitia ......... H02G 3/083
9,595,859 B2 * 3/2017 Dhawan ................. H02K 21/22
9,705,378 B2 * 7/2017 Suzuki ................... H02K 7/116
9,774,290 B2 * 9/2017 Dhawan .................. B60L 50/20

(Continued)

*Primary Examiner* — Timothy Wilhelm

(57) ABSTRACT

A hub motor includes an axle, a stator, a rotor, a casing and a power cord. The axle fixes the hub motor to a frame of a bicycle. The stator is fixed to the axle and connected to a control unit. The rotor is rotatably sleeved on the axle and rotates around the stator. The casing is rotatably sleeved on the axle and driven by the rotor to rotate around the rotor and the axle. The casing has an accommodating space and an opening. The accommodating space accommodates the stator and the rotor, and the opening communicates with the accommodating space. The power cord is arranged in the opening and includes a positioning structure and a wire. The wire is electrically connected to a control unit, and the positioning structure covers the wire. The positioning structure has a first rib and a second rib.

7 Claims, 5 Drawing Sheets

(56) References Cited

U.S. PATENT DOCUMENTS

| | | | | |
|---|---|---|---|---|
| 9,950,609 | B2 * | 4/2018 | Takehana | B60L 3/0061 |
| 2011/0290520 | A1 * | 12/2011 | Nishimura | H02G 3/22<br>174/50.5 |
| 2017/0050700 | A1 * | 2/2017 | Lemmens | B62M 6/45 |
| 2025/0095884 | A1 * | 3/2025 | Hartl | F04B 35/04 |
| 2025/0286430 | A1 * | 9/2025 | Yao | B62K 25/02 |

* cited by examiner

HUB MOTOR

FIELD OF THE INVENTION

The present disclosure relates to a motor, and more particularly to a hub motor installed on a bicycle.

BACKGROUND OF THE INVENTION

A bicycle is a human-powered vehicle that has a history of more than a century since its development. Because the power of the bicycle mainly comes from human, it is difficult to drive the bicycle by means of human power when the bicycle is on a steep uphill road. Although the thrust can be increased by changing the gear ratio, the effect is still limited.

A hub motor is a motor in which an internal mechanism drives the casing to rotate. When applied to a bicycle, the hub motor is mounted on the front wheel or the rear wheel of the bicycle, and the casing of the hub motor is connected to the front wheel or the rear wheel. Thereby, the hub motor can be used as auxiliary power of the bicycle to drive the wheel to rotate.

SUMMARY OF THE INVENTION

The present disclosure provides a hub motor with the advantage of having a power cord that is not easily loosened.

In order to achieve the above advantage, an embodiment of the present disclosure provides a hub motor, suitable to be mounted on a bicycle, including an axle, a stator, a rotor, a casing, and a power cord. The axle fixes the hub motor to a frame of the bicycle. The stator is fixed to the axle and suitable to be connected to a control unit. The rotor is rotatably sleeved on the axle and suitable to rotate around the stator. The casing is rotatably sleeved on the axle and suitable to be driven by the rotor to rotate around the rotor and the axle. The casing has an accommodating space and an opening. The accommodating space accommodates the stator and the rotor, and the opening communicates with the accommodating space. The power cord is arranged in the opening and includes a positioning structure and a wire. The wire is electrically connected to the control unit, and the positioning structure covers the wire. The positioning structure has a first rib and at least one second rib. The first rib is located between one end of the positioning structure and the second rib and is suitable to be clamped in the casing, and the at least one second rib is adjacent to the first rib and suitable to press a wall surface of the opening.

In an embodiment, the casing has an axle hole. The axle is arranged to pass through the axle hole, and the opening is located on one side of the axle hole and communicates with the axle hole.

In an embodiment, the positioning structure has an abutting surface corresponding to a surface profile of the axle. The abutting surface is located on a side of the positioning structure close to the axle and in surface contact with the axle.

In an embodiment, the hub motor further includes a connecting member. One end of the connecting member is connected to the frame, and the other end is arranged to pass through the axle hole. The axle is sleeved on the connecting member, and the positioning structure is connected to the connecting member. One part of the abutting surface contacts the axle, and the other part contacts the connecting member.

In an embodiment, the quantity of the at least one second rib is plural, and the second ribs are spaced apart from each other.

In an embodiment, the first rib extends along a radial direction away from the axle to form a blocking member. The blocking member has a blocking surface, and a normal direction of the blocking surface is parallel to an extending direction of the axle.

In an embodiment, the at least one second rib forms a convex ring around a surface of the positioning structure, and an axial direction of the convex ring is the same as an extending direction of the wire.

In an embodiment, in a radial direction of the wire, a thickness of the convex ring is less than a thickness of the blocking member.

Based on the above, according to the hub motor of the present disclosure, the positioning structure of the power cord has the first rib and the second rib different from the first rib, the power cord can be clamped by the casing by means of the first rib, and the second rib can press the wall surface of the opening. Therefore, the power cord can be fixed firmly and thus cannot easily come off from the hub motor, moreover, the wire inside the power cord can be prevented from being exposed.

Other objectives, features and advantages of the present disclosure will be further understood from the further technological features disclosed by the embodiments of the present disclosure wherein there are shown and described preferred embodiments of this present disclosure, simply by way of illustration of modes best suited to carry out the present disclosure.

DETAILED DESCRIPTION OF PREFERRED EMBODIMENTS

Figure 1A:
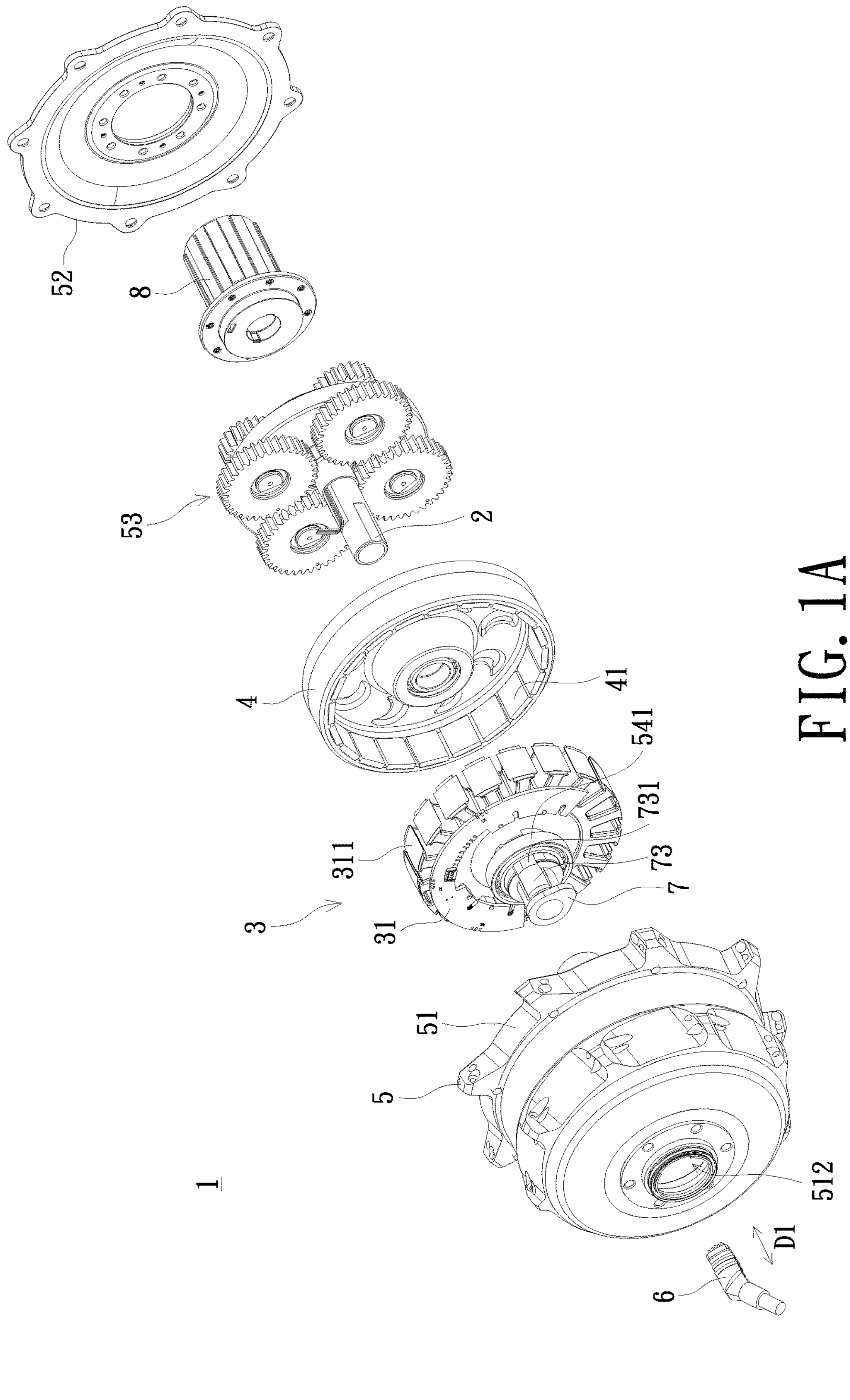
FIG. 1A is a schematic exploded view of a hub motor according to an embodiment of the present disclosure.

Terms used in the description of the embodiments of the present disclosure, for example, orientation or position relation such as “above” and “below” are described according to the orientation or position relation shown in the drawings. The above terms are used for facilitating description of the present disclosure rather than limiting the present disclosure, i.e., indicating or implying that the mentioned elements have to have specific orientations and to be configured in the specific orientations. In addition, terms such as “first” and “second” involved in the description or claims are merely used for naming the elements or distinguishing different embodiments or ranges rather than limiting the upper limit or lower limit of the quantity of the elements.

Figure 1B:
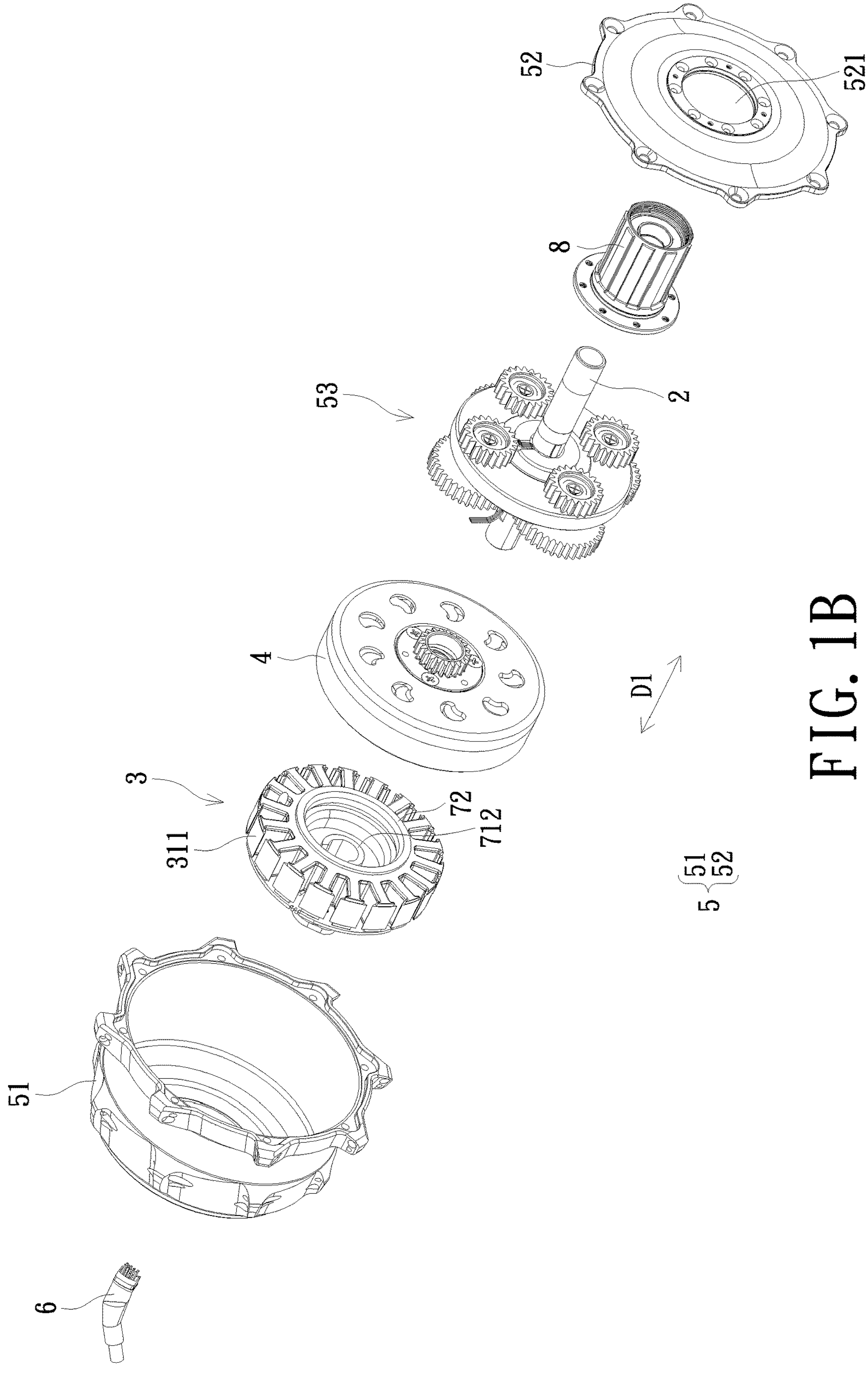
FIG. 1B is a schematic exploded view of the hub motor in FIG. 1A from another viewing angle.
Figure 2:
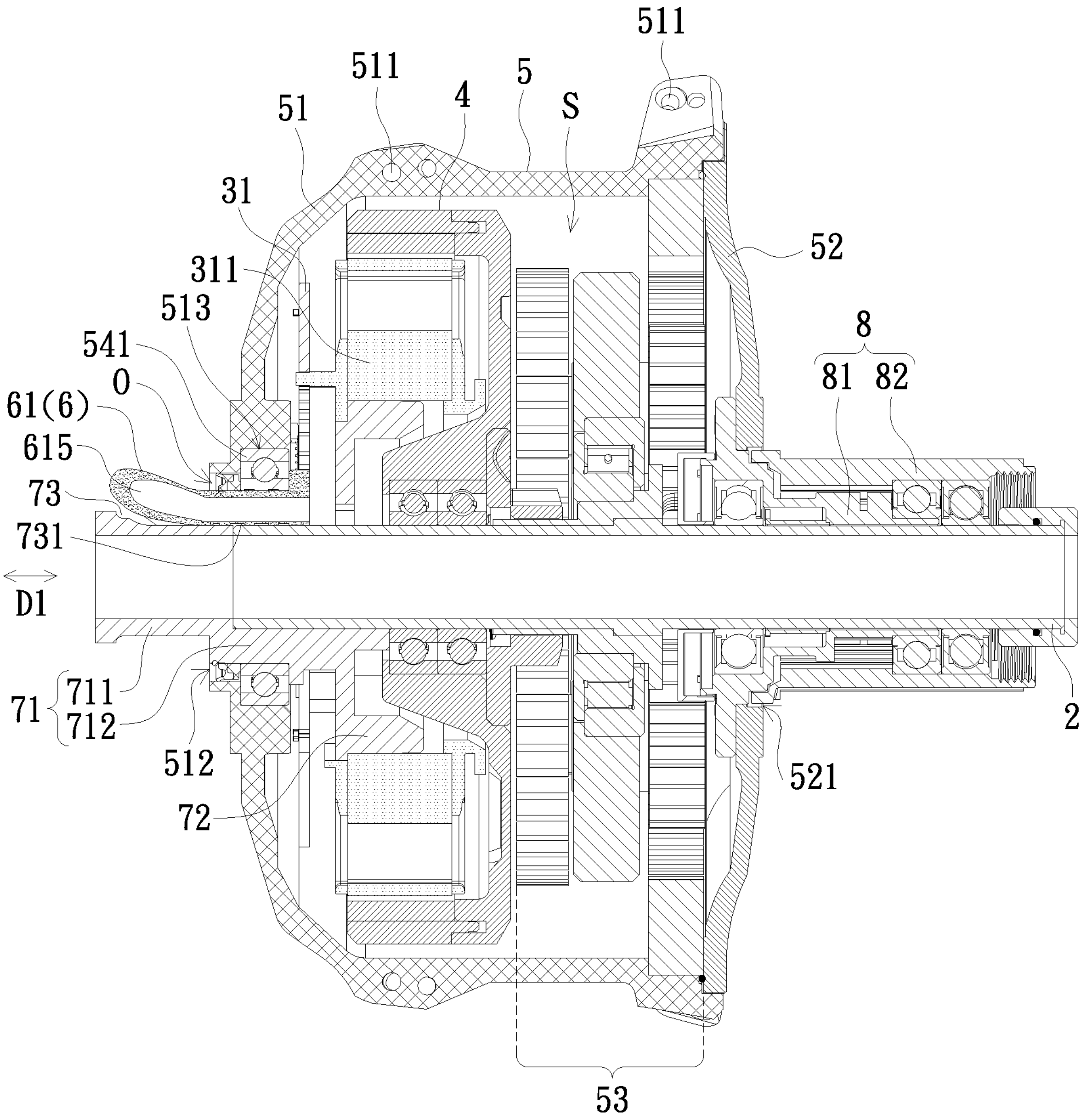
FIG. 2 is a schematic cross-sectional view of the hub motor in FIG. 1A.
Figure 3A:
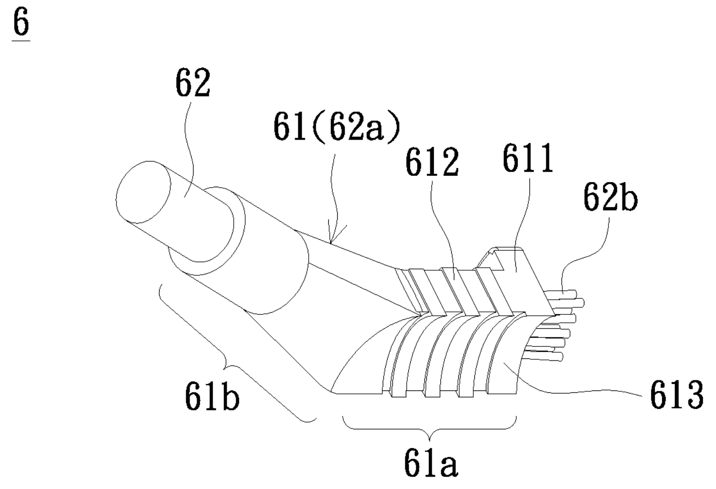
FIG. 3A and FIG. 3B are schematic three-dimensional views of a power cord in FIG. 2 from different angles.

FIG. 1A is a schematic exploded view of a hub motor according to an embodiment of the present disclosure. FIG. 1B is a schematic exploded view of the hub motor in FIG. 1A from another viewing angle. FIG. 2 is a schematic cross-sectional view of the hub motor in FIG. 1A. As shown in FIG. 1A to FIG. 2, a hub motor 1 provided by this embodiment is suitable to be mounted on a bicycle (not shown) and includes an axle 2, a stator 3, a rotor 4, a casing 5 and, a power cord 6. The axle 2 fixes the hub motor 1 to a frame (not shown) of the bicycle. The stator 3 is fixed to the axle 2 (as shown in FIG. 1A, the stator 3 is directly connected to the axle 2) and suitable to be connected to a control unit 31. The rotor 4 is rotatably sleeved on the axle 2 and suitable to rotate around the stator 3. The casing 5 is rotatably sleeved on the axle 2 and suitable to be driven by the rotor 4 to rotate around the rotor 4 and the axle 2. The casing 5 has an accommodating space S and an opening O. The accommodating space S accommodates the stator 3 and the rotor 4, and the opening O communicates with the accommodating space S. The power cord 6 is arranged in the opening O and includes a positioning structure 61 and a wire 62 (as shown in FIG. 3A). The wire 62 is electrically connected to the control unit 31, and the positioning structure 61 covers the wire 62. The positioning structure 61 has a first rib 611 and at least one second rib 612. The first rib 611 is located between one end of the positioning structure 61 and the second rib 612 and suitable to be clamped in the casing 5, and the second rib 612 is adjacent to the first rib 611 and suitable to press a wall surface of the opening O.

In this embodiment, the hub motor 1 is, for example, mounted on a rear wheel of the bicycle, the axle 2 is, for example, fixed to the frame of the bicycle, and the casing 5 is, for example, indirectly connected to a wheel frame of the rear wheel of the bicycle through a plurality of spokes connected to a plurality of holes 511 in the casing 5, so that the casing 5 drives the rear wheel to rotate when rotating. The mounting position of the hub motor 1 is not limited to the rear wheel.

As shown in FIG. 1A to FIG. 2, in this embodiment, the casing 5 includes, for example, a body 51, a side cover 52, and a planetary gear set 53. The accommodating space S is formed inside the body 51, and the holes 511 are located on an outer surface of the body 51. The side cover 52 is configured to cover an opening (not marked because it is covered) on one side of the body 51 so as to protect components such as the axle 2, the stator 3, the rotor 4, the planetary gear set 53, etc. The body 51 and the side cover 52 are respectively provided with a first axle hole 512 and a second axle hole 521 corresponding to an axis of the axle 2. An arrangement groove 513 is formed around the first axle hole 512. The arrangement groove 513 is located in the accommodating space S and configured to accommodate a rolling bearing 541. The casing 5 is rotatably sleeved on the axle 2 through the rolling bearing 541. The rolling bearing 541 is, for example, a radial bearing, and has an outer ring 541*a*, an inner ring 541*b* and a plurality of rollers 541*c*. In a radial direction of the first axle hole 512, a gap 541*d* is formed between the outer ring 541*a* and the inner ring 541*b*, but the type of the rolling bearing 541 is not limited thereto.

Figure 4:
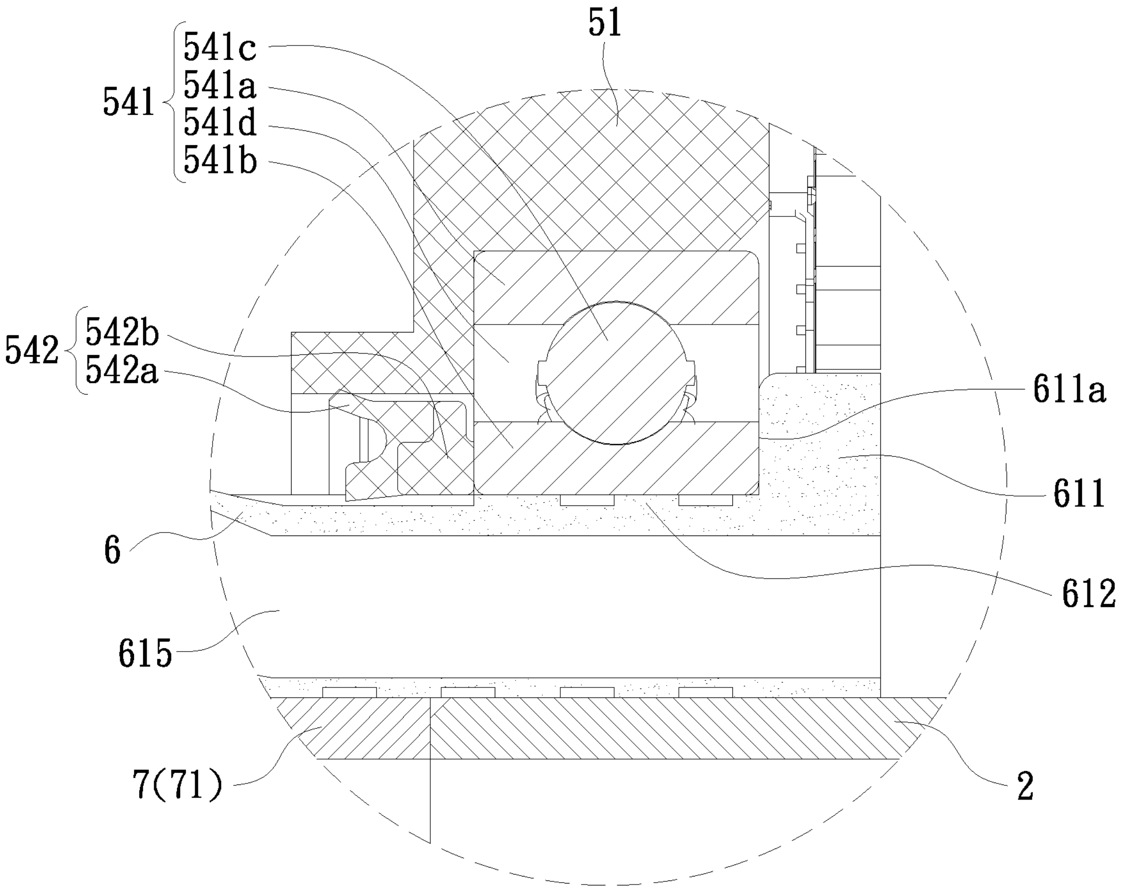
FIG. 4 is a schematic partial enlarged view of a mounting place of the power cord in FIG. 2.

In addition, in this embodiment, the casing 5 further includes, for example, a waterproof member 542 (as shown in FIG. 4). The waterproof member 542 is located in the first axle hole 512, and includes, for example, a sealing gasket 542*a* and a pressure ring 542*b*. The sealing gasket 542*a* is suitable to seal a seam between the first axle hole 512 and other components (detailed later). The pressure ring 542*b* is suitable to press the sealing gasket 542*a*, thereby preventing the gap 541*d* generated between the sealing gasket 542*a* and other components. However, the structure of the casing 5 is not limited to the above description.

In this embodiment, the stator 3 controls an electromagnet assembly 311 mounted to the stator 3, for example, through the control unit 31. The control unit 31 is, for example, connected to the electromagnet assembly 311 and located in the accommodating space S, but is not limited thereto. Specifically, in other embodiments, the control unit 31 is, for example, mounted on another position (for example, a controller on a handlebar) on the bicycle, and is, for example, electrically connected to the electromagnet assembly 311 in the accommodating space S through the power cord 6 and located outside the accommodating space S. The electromagnet assembly 311 generates a magnetic field by a current provided by the power cord 6, so that the rotor 4 including, for example, a magnet 41, rotates with respect to the stator 3. When the rotor 4 rotates, the rotor 4 drives the casing 5 to rotate by means of the planetary gear set 53. The control unit 31 controls a magnetic field strength generated by the electromagnet assembly 311, for example, by controlling the current supplied to the electromagnet assembly 311, so as to change a rotational speed of the casing 5.

As shown in FIG. 1A and FIG. 2, in this embodiment, the hub motor 1 further includes, for example, a connecting member 7. The connecting member 7 includes a first combination portion 71 and a second combination portion 72. The first combination portion 71 is, for example, a cylinder that tapers along an extending direction D1 of the axle 2, and suitable to be sleeved on the axle 2. The second combination portion 72 is a disk body around the first combination portion 71, and is located on one end of the connecting member 7 close to the axle 2 and suitable to be connected to the stator 3. However, the shape of the connecting member 7 is not limited thereto.

As shown in FIG. 1B and FIG. 2, in this embodiment, the first combination portion 71 includes a first section 711 and a second section 712. The first section 711 has a diameter smaller than a diameter of the second section 712. During the assembly, the first section 711 runs out of the accommodating space S and away from the first axle hole 512, and is suitable to be connected to the frame of the bicycle. The second section 712 has a diameter greater than a diameter of the axle 2, and an outer diameter corresponding to a diameter of the first axle hole 512. The second section 712 has a depression inside so as to form a sleeve corresponding to the diameter of the axle 2, and is suitable to be sleeved and fixed on the axle 2. During the assembly, an outer diameter surface of the second section 712 is supported by the rolling bearing 541 mounted on the casing 5. With this structure, the casing 5 is rotatably sleeved on the connecting member 7, but not limited thereto.

As shown in FIG. 1A and FIG. 2, in this embodiment, the opening O communicates with the first axle hole 512 and is located on one side of the first axle hole 512. Specifically, as shown in FIG. 1A, the connecting member 7 passing through the first axle hole 512 is provided with a mounting groove 73 on one side. The mounting groove 73 is suitable to accommodate the power cord 6. An extending direction of the mounting groove 73 is parallel to the extending direction D1 of the axle 2, and a length of the mounting groove 73 along the extending direction D1 extends from the first combination portion 71 to the second combination portion 72 and runs out of the accommodating space S through the first axle hole 512 (as shown in FIG. 2). In other words, in this embodiment, the opening O described above is formed by the wall surface of the first axle hole 512 of the body 51 of the casing 5 and the wall surface of the mounting groove 73. Alternatively, from another perspective, in this embodiment, by means of the mounting groove 73 on the connecting member 7, a part of the area in the first axle hole 512 is used as the opening O. The detailed structure of the connecting member 7 is not limited to the description above.

As shown in FIG. 1A and FIG. 2, in this embodiment, a part of the mounting groove 73 at the second section 712 is formed with a depression 731 (as shown in FIG. 1A), so that a part of the axle 2 sleeved on the connecting member 7 is exposed in the mounting groove 73. However, the detailed shape of the mounting groove 73 is not limited thereto.

As shown in FIG. 1A to FIG. 2, in this embodiment, the hub motor 1 further includes, for example, a sleeve assembly 8. The sleeve assembly 8 includes an inner sleeve 81 and an outer sleeve 82. The inner sleeve 81 is rotatably sleeved on the axle 2 and fixedly connected to the casing 5. The outer sleeve 82 is connected to sprockets. There is an internal ratchet structure (not shown) between the inner sleeve 81 and the outer sleeve 82, and the internal ratchet structure is suitable to make the outer cylinder 82 only capable of driving the inner sleeve 81 to rotate along an actuating direction and make the outer cylinder incapable of driving the inner barrel 81 to rotate when rotating along a direction opposite to the actuating direction. Thereby, when the user presses pedals, the sprockets can be driven by a chain (not shown) of the bicycle so as to drive the sleeve assembly 8 and the casing 5 to rotate.

Figure 3B:
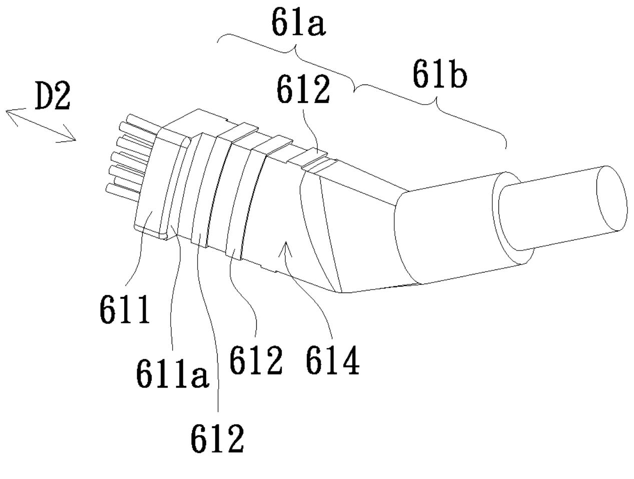

FIG. 3A and FIG. 3B are schematic three-dimensional views of the power cord in FIG. 2 from different angles. FIG. 4 is a schematic partial enlarged view of a mounting place of the power cord in FIG. 2. As shown in FIG. 3A and FIG. 3B, in this embodiment, the power cord 6 includes a wire 62 and a positioning structure 61. The positioning structure 61 is, for example, a sheath 62*a* that is formed on and covers the wire 62. The sheath 62*a* is, for example, made of a flexible material or an elastic material, and specifically, for example, plastic. The sheath 62*a* has a positioning section 61*a* and an extending section 61*b*. A channel 615 through which a conductive wire 62*b* runs is formed inside the sheath 62*a* (for the convenience of clearly illustrating the position of the channel 615, the conductive wire 62*b* in the channel 615 is not shown in FIG. 2 and FIG. 4). The wire 62 is, for example, formed by winding a plurality of conductive wires 62*b* with each other. In this embodiment, the wire 62 is divided into the plurality of conductive wires 62*b* inside the sheath 62*a* only after entering the extending section 61*b*, so as to be connected to the control unit 31 on the stator 3.

A cross-sectional shape of the positioning section 61*a* along an extending direction D2 (as shown in FIG. 3B) of the power cord 6 is, for example, a rectangle with a cambered surface corresponding to the shape of the opening O (the mounting groove 73), and a length of the positioning section along the extending direction D2 of the power cord 6 corresponds to, for example, a thickness of the casing 5, so that the extending section 61*b* is located outside the casing 5. However, the design of the positioning section 61*a* is not limited thereto. The positioning structure 61 is arranged on the positioning section 61*a*. The extending section 61*b* may be bent relative to the positioning section 61*a* along the direction of the wire 62 (as shown in FIG. 3A to FIG. 4).

The positioning section 61*a* has a first abutting surface 613 and a second abutting surface 614 corresponding to the shape of the wall surface which the positioning section contacts when it is mounted. The first abutting surface 613, for example, faces the axle 2 and the connecting member 7 and corresponds to the shape of the surface of the axle 2 and the connecting member 7, and is suitable to be in surface contact with the axle 2 and the connecting member 7 when it is arranged. The second abutting surface 614, for example, faces the rolling bearing 541 and corresponds to the shape of the surface of the rolling bearing 541, and is in surface contact with the rolling bearing 541 when it is arranged, but is not limited thereto.

As shown in FIG. 3A, FIG. 3B and FIG. 4, in this embodiment, the first rib 611 is, for example, a blocking member formed by extending along a radial direction away from the axle 2, and the first rib 611 is, for example, located on an end close to the positioning section 61*a* and away from the extending section 61*b*. The first rib 611 has a blocking surface 611*a*, and a normal direction of the blocking surface 611*a* is parallel to the extending direction D1 of the axle 2. As shown in FIG. 4, during the assembly, since a size of the part of the positioning section 61*a* at the first rib 611 is greater than a cross-sectional area of the opening O, the positioning structure 61 can prevent the power cord 6 from escaping from the opening O along the extending direction D2 of the power cord 6 through the interaction between the blocking surface 611*a* and the rolling bearing 541. Since the power cord 6 is mounted in the opening O, the extending direction D2 is parallel to the extending direction D1. However, the detailed shape of the first rib 611 is not limited thereto.

As shown in FIG. 4, in this embodiment, a height of the first rib 611 in the radial direction away from the axle 2 is, for example, greater than a thickness of the inner ring 541*b* of the rolling bearing 541, but less than the thickness of the inner ring 541*b* plus the gap 541*d*, so that the first rib does not contact the outer ring 541*a*. However, the height of the first rib 611 is not limited thereto.

As shown in FIG. 3A, FIG. 3B and FIG. 4, in this embodiment, the second rib 612 is, for example, a convex ring around a surface of the sheath 62*a*. In this embodiment, the quantity of the second ribs 612 is, for example, three, and the second ribs are spaced apart from each other and have a gap therebetween. An axial direction of the second rib 612 is the same as the extending direction D2 of the wire 62. A thickness of the second rib 612 is, for example, such that the outer diameter of the power cord 6 corresponds to a width of the mounting groove 73 of the connecting member 7. In a radial direction of the wire 62, the thickness of the second rib 612 is less than the thickness of the first rib 611.

As shown in FIG. 1A, FIG. 2 and FIG. 4, in this embodiment, because the length of the positioning section 61*a* along the extending direction D1 of the axle 2 is greater than the thickness of the casing 5, the second rib 612 (convex ring) contacts the axle 2 and the connecting member 7 during the assembly. In this embodiment, the mounting groove 73 is formed with the depression 731 at the second section 712 (as shown in FIG. 1A), therefore, by the aid of the structure of the depression 731, one part of the second ribs 612 contact the axle 2 during the connection, and the other part of the second ribs 612 contact the connecting member 7. Thereby, when the connecting member 7, the axle 2 or the rolling bearing 541 of the casing 5 moves relative to other components due to external force, the second ribs 612 can receive the pressure of the wall surface of the opening O, thereby increasing the connection strength between the power cord 6 and the casing 5. Specifically, in this embodiment, wall surfaces that can press the second rib 612 include the wall surface of the rolling bearing 541, the wall surface of the mounting groove 73 and the wall surface of the axle 2, but are not limited thereto.

As shown in FIG. 3A, FIG. 3B and FIG. 4, in this embodiment, because the part of the second rib 612 closest to the extending section 61*b* facing the second abutting surface 614 just corresponds to the mounting position of the waterproof member 542 when it is mounted, therefore, for the sake of waterproofness, this second rib 612 corresponding to the mounting position of the waterproof member 542 does not surround the whole sheath 62*a*, which is not limited thereto.

Based on the above, according to the hub motor of the present disclosure, the positioning structure of the power cord has the first rib and the second rib different from the first rib, the power cord can be clamped by the casing by means of the first rib, and the second rib can press the wall surface of the opening. Therefore, the power cord can be fixed firmly and thus cannot easily come off from the hub motor, moreover, the wire inside the power cord can be prevented from being exposed.

What is claimed is:

1. A hub motor, suitable to be mounted on a bicycle, the hub motor comprising:

an axle, fixing the hub motor to a frame of the bicycle;

a stator, fixed to the axle and suitable to be connected to a control unit;

a rotor, rotatably sleeved on the axle and suitable to rotate around the stator;

a casing, rotatably sleeved on the axle and suitable to be driven by the rotor to rotate around the rotor and the axle, the casing having an accommodating space and an opening, the accommodating space accommodating the stator and the rotor, and the opening communicating with the accommodating space; and a power cord, arranged in the opening and comprising a positioning structure and a wire, the wire being electrically connected to the control unit, and the positioning structure covering the wire;

wherein the positioning structure has a first rib and at least one second rib, the first rib being located between one end of the positioning structure and the at least one second rib and suitable to be clamped in the casing, and the at least one second rib being adjacent to the first rib and contacting the casing and the axle and being suitable to press a wall surface of the opening;

the casing has an axle hole, the axle is arranged to pass through the axle hole, and the opening is located on one side of the axle hole and communicates with the axle hole.

2. The hub motor according to claim 1, wherein the positioning structure has an abutting surface corresponding to a surface profile of the axle, the abutting surface is located on a side of the positioning structure close to the axle and in surface contact with the axle.

3. The hub motor according to claim 2, further comprising a connecting member, wherein a first end of the connecting member is connected to the frame, and a second end of the connecting member is arranged to pass through the axle hole, the axle is sleeved on the connecting member, the positioning structure is connected to the connecting member, a first part of the abutting surface contacts the axle, and a second part of the abutting surface contacts the connecting member.

4. The hub motor according to claim 1, wherein a quantity of the at least one second rib is plural, and the second ribs are spaced apart from each other.

5. The hub motor according to claim 1, wherein the first rib extends along a radial direction away from the axle to form a blocking member, the blocking member has a blocking surface, and a normal direction of the blocking surface is parallel to an extending direction of the axle.

6. The hub motor according to claim 5, wherein the at least one second rib forms a convex ring around a surface of the positioning structure, and an axial direction of the convex ring is the same as an extending direction of the wire.

7. The hub motor according to claim 6, wherein in a radial direction of the wire, a thickness of the convex ring is less than a thickness of the blocking member.

* * * * *